United States Patent [19]

Oishi et al.

[11] 4,076,186

[45] Feb. 28, 1978

[54] MAGNETIC TAPE CASSETTES

[75] Inventors: Kengo Oishi; Osamu Suzuki, both of Odawara, Japan

[73] Assignee: Fuji Photo Film Co., Ltd., Minami-ashigara, Japan

[21] Appl. No.: 734,692

[22] Filed: Oct. 21, 1976

[30] Foreign Application Priority Data

Oct. 23, 1975   Japan .......................... 50-144708[U]

[51] Int. Cl.² ........................................... G11B 23/10
[52] U.S. Cl. ...................................... 242/199; 242/76
[58] Field of Search ............... 242/199, 200, 198, 197, 242/71.2, 76; 360/93, 132

[56] References Cited

U.S. PATENT DOCUMENTS

| 3,601,654 | 8/1971 | Long et al. | 242/199 |
| 3,826,489 | 7/1974 | Watkins, Jr. | 242/76 |
| 3,848,265 | 11/1974 | Biery et al. | 242/199 |
| 3,934,842 | 1/1976 | Posso | 242/199 |

*Primary Examiner*—George F. Mautz
*Attorney, Agent, or Firm*—Sughrue, Rothwell, Mion, Zinn and Macpeak

[57] ABSTRACT

A magnetic tape cassette including four rotatably supported guide rollers 40, 40'', 41, 41' in place of conventional fixed pins to assure positive biasing correction of a travelling tape, and mating insert tabs 46 and elongated slots 47 disposed on the raised edges of the upper and lower cases 32, 33 of the cassette to increase the rigidity of the cases and decrease strains, and to accurately maintain the parallelism of the reels and the guide rollers.

5 Claims, 7 Drawing Figures

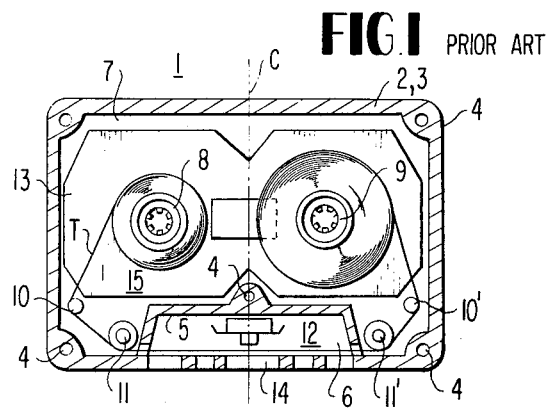
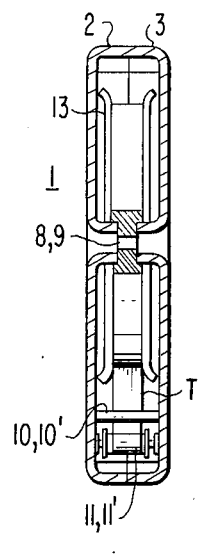
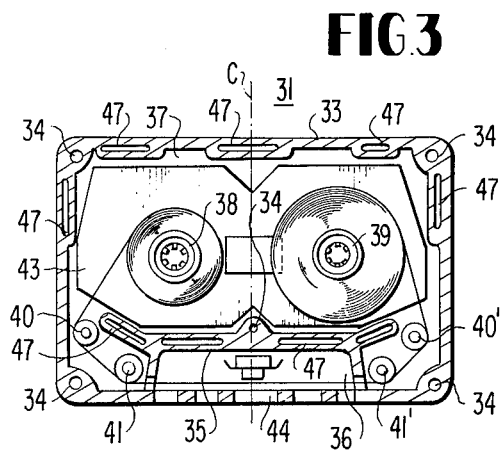

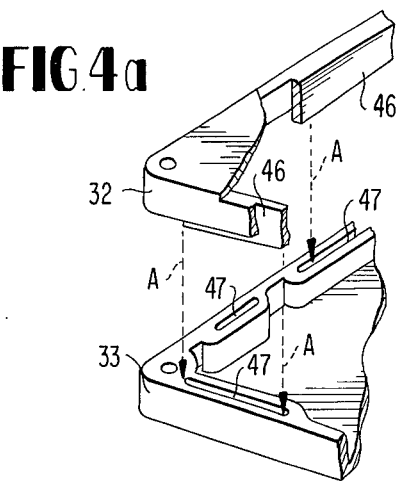
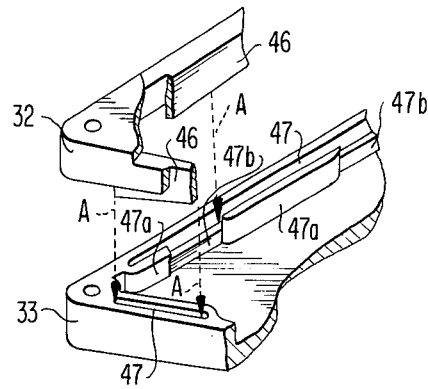
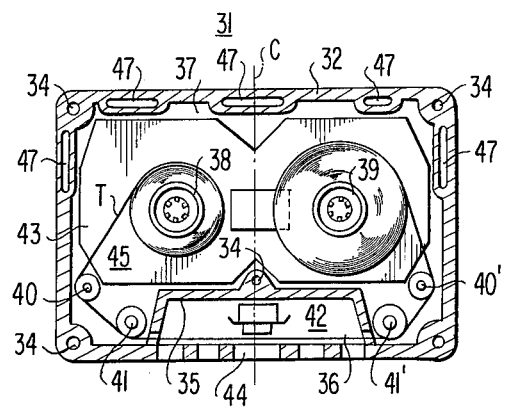
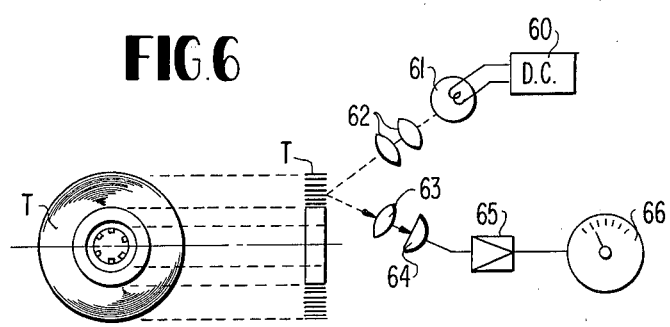

MAGNETIC TAPE CASSETTES

BACKGROUND OF THE INVENTION

1. Field of the Invention

This invention relates to magnetic tape cassettes, and in particular, to a tape cassette encasing therein a feed reel on which magnetic tape is wound and a take-up reel.

2. Description of the Prior Art

With the recent development of small and lightweight cassette tape recorders, the cassettes for tapes used therein are miniaturized, and further it is highly desirable that the tape in the cassette is capable of providing high density recording and reproduction for a long period of time. Tapes which fulfill the need as noted above include tapes such as the so-called C-120, C-180 and the like, which have been put to practical use. It is also required that the surface of the recording medium have a mirror-like finish to provide high density recording and reproduction.

In the past, tapes with surfaces finished as previously mentioned and which are very thin have been set within a tape cassette as shown in FIGS. 1 and 2.

The cassette 1 comprises an upper case 2 and a lower case 3, which are integrally fastened by fastner members 4 to form a hollow interior which is divided into a recording and reproduction area 6 and a reel receiving area 7 by a partition member 5 formed to project from inner surfaces of the upper and lower cases 2 and 3, respectively. The reel receiving area 7 includes a pair of reels 8, 9, flanged rotary guide rollers 11, 11', fixed pins 10, 10' arranged in symmetrical fashion relative to a center line C, and cushion sheets 13 disposed between the inner surfaces of the upper and lower cases 2, 3 and sides of the reels 8, 9.

The recording and reproduction area 6 includes a pressure means 12 for pressing an antimagnetism surface of tape T, and the upper and lower cases 2, 3 defining the recording and reproduction area 6 have a plurality of openings 14 at the sides thereof.

The tape T, one end of which engages the reel 8 while the other end engages the reel 9, passes along a tape travel path 15, which comprises fixed pin 10, flanged rotary guide roller 11, pressure means 12, flanged rotary guide roller 11', and fixed pin 10'. The position of the tape in the direction of the width thereof is constantly being corrected by the cushion sheets 13 which are preferably embossed and have a low coefficient of friction.

It should be noted that the flanged rotary guide rollers 11, 11' also have the function of correcting the position of the tape in of the width direction, similarly to that of the cushion sheets 13, when the tape T travels, but the fixed pins 10, 10' only serve to carry the tape T by the outer peripheral surfaces thereof.

Further, the upper and lower cases 2, 3 have been formed flat; except for the portions which the fastner members 4 extend through.

However, the well-known tape cassettes as previously mentioned have the following disadvantages:

(1) The repetition of quick feeding and unreeling operations and low speed recording and reproduction operations causes a rapid shift between low speed sliding contact status of the tape and a high speed sliding status of the tape at the outer peripheral surfaces of the fixed pins 10, 10'. As a consequence the tape tends to move to the upper and lower parts of the pins. In addition, if cores of the fixed pins 10, 10' or the outer peripheral surfaces thereof are not exactly parallel to each other and to the surface of the tape T, a steep variations in tension result thereby biasing the tape T in the width direction to accelerate an unbalanced stress. As a consequence creases, uneven elongation at one edge, scratches, etc. are induced in the surface of the tape to materially render the reproduction output unstable.

(2) If a strain is produced when the upper and lower cases 2 and 3 are assembled, the reels 8, 9 supported on the upper and lower cases 2, 3, the fixed pins 10, 10' and the flanged rotary guide rollers 11, 11' tend to be out of alignment, resulting in an increase of travelling, particularly, biasing in the width direction of the tape T.

SUMMARY OF THE INVENTION

It is an object of the present invention to overcome the disadvantages noted above with respect to prior art tape cassettes by providing a tape cassette in which the travelling of the tape is improved.

The above-mentioned object of the present invention may be achieved by a magnetic tape cassette characterized in that the travel path of the magnetic tape comprises at least four rotatably supported guide rollers, and at least two pairs of mating insert tabs and slots which can be engaged and disengaged from each other, and which are formed on the inner surfaces of the upper and lower cases.

BRIEF DESCRIPTION OF DRAWINGS

FIGS. 1 and 2 are sectional views of a conventional cassette;

FIG. 3 is a sectional view showing one embodiment of a cassette according to the present invention;

FIGS. 4a and 4b are perspective views showing corner portions of cassettes according to the present invention in an enlarged scale and in a cutaway form;

FIG. 5 is a sectional view of a test embodiment of a cassette according to the present invention; and FIG. 6 is a conceptual view of a device for measuring the smoothness of the surface of a reeled tape.

DESCRIPTION OF THE PREFERRED EMBODIMENTS

A preferred embodiment of a cassette according to the present invention will now be described in detail with reference to the accompanying drawings.

Referring to FIG. 3 and FIG. 4a, there is shown a tape cassette 31 comprising an upper case 32 and a lower case 33 made of a plastic material such as styrol or ABS resin, said cases being integrally fastened by fastener members 34 in the form of metal screws to form a hollow interior which is divided into a recording and reproduction area 36 and a reel receiving area 37 by a partition member 35 formed by raised inner surfaces of the upper and lower cases 32 and 33. The reel receiving area 37 includes a pair of reels 38, 39, two pairs of flanged rotary guide rollers 40, 41 and 40', 41' of hard plastic material, such as polyacetal, positioned in symmetrical fashion relative to a center line C, and a plastic embossed cushion sheet 43 having a thickness of 50μ to 150μ. The sheet may be made from polyethylene, teflon or synthetic paper and one each is disposed between the inner surfaces of the upper and lower cases 32, 33 and sides of the reels 38, 39.

The recording and reproduction area 36 includes a pressure means 42 with a pressure-pad for pressing an antimagnetic surface of tape T, and the upper and lower cases 32, 33 defining the recording and reproduction area 36 are formed with a plurality of openings 44 at the sides thereof.

Referring to FIG. 4a, on the peripheral wall ends of the upper and lower cases 32, 33 and in the periphery of the partition member 35 are disposed insert tabs 46 and elongated mating slots 47 which project from the inner surfaces of the upper and lower cases 32, 33 in such a manner so as not to impede turning and travelling of the tape T when wound to its maximum diameter on the reels 38, 39, and which can be engaged and disengaged with each other in the direction of arrow A.

The operation will now be described.

Tape T, one end of which engages the reel 38 while the other end engages the reel 39, passes along a tape travel route 45, which comprises the flanged rotary guide rollers 40, 41, the pressure means 42, and the flanged rotary guide rollers 40', 41', and during the travelling, the middle portion of the tape is smoothly supported and corrected in its biasing by the flanged rotary guide rollers 40, 41, 40' and 41'. The tape is further corrected in its width position by the surface of the cushion sheets 43, which are embossed and have low friction coefficients.

It should be noted that the tabs 46 and slots 47 may be changed suitably in their raised portion, length and number if there is not enough space available in the internal layout of the tape cassette 31. However, it is desirable to arrange at least two pairs of tabs 46 and slots 47 in different relative directions so as to better unity the planeness of each case 32, 33. That is, it is preferred to have at least one pair of tabs and slots arranged in different directions to each other, for example on perpendicular edges of the case, to preserve balance and increase rigidity. If the slots 47 are not isolated from each other as shown in FIG. 3 and FIG. 4a, but the inner wall 47a is suitably cut while the bottom 47b is in communication as shown in FIG. 4b, the tab 46 may be permitted to correspond to the full length of the bottom 47b to thereby provide an integral structure.

Further, the flanged rotary guide rollers are not limited to four in number as in the foregoing embodiment, and it may be desirable to increase the number of rollers so as to reduce the contact angle of each guide roller to the tape T in order that the travelling of the tape T may be further stabilized.

Further, in the shorter cassette tapes, of the C-30 and C-46 types, for example, which carry out recording and reproduction in a relatively short period of time, flangeless rotary guide rollers may be employed in place of the flanged rotary guide rollers as previously mentioned to form the aforementioned travel route of tape.

From the foregoing, the cassette of the present invention affords the following novel advantages:

(1) Since the flanged rotary guide rollers 40, 40' are used in place of the fixed pins 10, 10' in the conventional cassette 1, whereby all of the mechanisms for travelling, guiding and supporting the tape are rotatable flanged rotary guide rollers, the travelling tape is more positively corrected due to its biasing by the flange portions of the guide rollers without producing a considerable difference in relative speed with respect to the aforesaid travelling and guiding mechanism, that is, without producing any slip or excessive winding, even when the tape feed is rapidly changed from a low speed to a high speed mode, and vice versa.

(2) Since the tabs 46 and slots 47 are receivably engaged with each other during assembly, and do not impede the turning and travelling of the tape, the structural rigidity of the upper and lower cases 32, 33 is greatly increased, as a consequence of which strains formed when the cases 32 and 33 are assembled are materially decreased to accurately maintain the parallelism of the reels 38, 39 and the flanged rotary guide rollers 40, 41, 40', and 41' with respect to the tape T.

(3) The advantages noted in (1) and (2) enable the tape to travel in a more stabilized manner so that creases, uneven elongation at one edge, scratches, etc. which materially render the reproduction output unstable, may be minimized.

To demonstrate the aforementioned novel effects, test results between an embodiment of the invention and a comparative example of the prior art are given below.

TEST EMBODIMENT

The tape used was a high density magnetic recording tape having a length of 180 m, comprising a magnetic layer $3\mu$ in thickness laid on one side of a support of a polyethylene telephthalate film $6\mu$ in thickness and 3.8 mm in width.

The test embodiment tape cassette used was of the "Phillips Type," in which as shown in FIG. 5, tabs 46 and mating slots 47 are disposed on three sides of the cases 32 and 33, four flanged rotary guide rollers 40, 41, 40' and 41' of a polyacetal material each having flange members disposed on opposite ends of a roller portion of 4 mm outside diameter are rotatably supported within the cassette, and a cushion sheet 43 of $80\mu$ thickness comprised of a polyethylene sheet into which carbon powder is mixed is disposed between the reels 38, 39 and the cases 32, 33.

The cassette with the tape encased therein was attached to a cassette tape recorder (National RQ-55), and the tape was unreeled and reeled 50 times at an average travel speed of 4.8 cm/sec. to measure the state of the wound surface of the tape, the reeling torque, and the deformation of the tape, yielding the results given in Table I.

COMPARATIVE EXAMPLE

The same type of tape as that used in the test embodiment was encased in a known tape cassette as shown in FIG. 1, also of the "Phillips Type," and the same parameters noted in the test embodiment were measured under the same conditions and after the same test runs. The results obtained are shown in Table I.

TABLE I

| ARTICLE MEASURED | TEST EMBODIMENT | | COMPARATIVE EXAMPLE | |
|---|---|---|---|---|
| 1. Max. value of torque | 60 g-cm | | 120 g-cm | |
| 2. Variation in torque | 3 g-cm | | 3 — 15 g-cm | |
| 3. Deformation of tape | None produced | | Uneven elongation at one edge | |
| 4. Phase displacement | Within 5° | | 10 – 15° | |
| 5. Flexure of cassette | less than 1 mm | | about 3 mm | |
| 6. Wound surface | (a) 70% | (b) 65% | (a) 40% | (b) 45% |

The measurements taken were made according to the following procedures:

(1) For the measurement of the maximum value of torque (1) and the variation in torque (2), a rotary torque meter, M-400, of Information Terminal Company was used.

(2) For determining the tape deformation, the surface of the tape after it had travelled 50 times was visually observed.

(3) For the measurement of the phase displacement, a signal of 6.3 KHZ was recorded on the tape, and a phase meter, MPN-553, of Meguro Denpa Company was used to measure the phase displacement between left and right channels.

(4) For the measurement of cassette flexure, the cases were assembled together, after which one short side of the case was fixed and a load of 1 Kg was placed on the other short side, to thereby measure the maximum flexure in a lengthwide direction.

(5) The state of the wound surface. The value in a PLAY state is indicated as (a) while the value in a REW state is indicated as (b). The surface state was measured by a procedure as shown in FIG. 6. The measuring system comprises a d.c. power source 60 for lighting a lamp 61, a lens 62 for condensing the light of the lamp 61 on the wound tape surface, and a lens 63 for condensing the light of the lamp 61 reflected from the tape wound surface. The reflected light is electrically converted by a photo-transistor 64, amplified at 65, and read by a meter 66 in which the reflection factor is indicated by a % mark. The better and more uniform the wound tape surface, the higher the reflection factor, whereby the wound surface quality may be ascertained by this measurement.

For calibration, the reflection factor was set at 100% when a mirror was used in place of the wound tape surface.

The measured results given in Table I clearly demonstrate that the cassette of the present invention is superior in every way to the prior art cassettes described initially.

While the invention has been described in detail and with reference to specific embodiments thereof, it will be apparent to one skilled in the art that various changes and modifications can be made therein without departing from the spirit and scope thereof.

What is claimed is:

1. In a magnetic tape cassette including upper and lower rectangular case members having peripheral inner walls secured together at their corners to define a hollow interior region therebetween, partition means within said interior region defining therein a recording and reproducing area and a tape storage area, a pair of parallel, rotatable reels mounted in said storage area and spaced from each other, a first pair of parallel, flanged rotary guide rollers mounted in said storage area on opposite sides of said recording and reproducing area, and a magnetic recording tape wound on and extending between said reels and guided in a path of travel through said recording and reproducing area by said guide rollers, the improvements characterized by:
 a. a second pair of parallel, flanged rotary guide rollers individually mounted in said storage area between said first pair of guide rollers and said reels, positioned closer to said first pair of guide rollers than to said reels, and serving to further define said path of travel of said tape,
 b. a plurality of elongated insert tabs mounted on and protruding along said peripheral walls, and projecting inwardly from one of said case members, and
 c. a plurality of elongated slots mounted on and projecting inwardly from the other of said case members, positioned to matingly receive said insert tabs when said case members are assembled and secured together, and having the bottom walls of said slots at a higher level than the height of the inner walls of said case members whereby said engaged tabs and slots increase the rigidity of said cassette and maintain the parallelism of said reels and guide rollers.

2. A magnetic tape cassette as defined in claim 1, wherein there are at least two pairs of mating tabs and slots, and they are positioned in different, non-parallel planes.

3. A magnetic tape cassette as defined in claim 1, wherein at least one pair of mating tabs and slots is formed integral with said partition means.

4. A magnetic tape cassette as defined in claim 2, wherein at least one pair of mating tabs and slots is formed integral with said partition means.

5. A magnetic tape cassette as defined in claim 2, wherein said tabs and slots are positioned along three peripheral edges of said cassette, and are substantially continuous along such edges.

* * * * *